Aug. 21, 1962 D. V. SINNINGER 3,050,194

RACK ASSEMBLY

Filed April 28, 1960 2 Sheets-Sheet 1

INVENTOR.

Dwight V. Sinninger.

BY

Olson, Mecklenburger, von Holst, Pendleton & Neuman. Attys.

INVENTOR.
Dwight V. Sinninger
BY
Olson, Mecklenburger, von Holst, Pendleton & Neuman Attys United States Patent Office 3,050,194

Patented Aug. 21, 1962

3,050,194
RACK ASSEMBLY

Dwight V. Sinninger, Oak Park, Ill., assignor to Senn Custom, Inc., Oak Park, Ill., a corporation of Illinois Filed Apr. 28, 1960, Ser. No. 25,406
10 Claims. (Cl. 211—147)

This invention relates to a rack assembly and more particularly to a slide construction for use in rack assemblies and adapted to slidably receive units such as chassis supporting electronic equipment.

While the invention described hereinafter is of general utility and should be limited only by the scope of the claims, the teaching is especially useful in racks for electronic equipment which are generally designated in the trade as "relay racks." Throughout the electronic industry it is conventional to mount equipment in vertical racks approximately seven feet high and having widths and depths appropriate for mounting chassis with front panels of a standard 19" width. The rack may be fabricated in many different ways but the customary mounting of the electronic units has been through unit supporting screws securing the 19" front panel to threaded vertical supports within the rack.

This mounting technique has created many problems and hazards. It is difficult to install an electronic unit in a rack using the common technique in that there is no means for supporting the unit in place while the front panel is being bolted to the front panel supports. Thus, throughout the industry the assembly of units in a rack is considered to be a job for at least two men. A first technician holds the unit in place against the vertical supports of the rack and attempts to align slots in the front panel with the threaded apertures in the vertical supports. At the same time a second technician endeavors to insert bolts or machine screws through the panel slots and thread them into the threaded apertures. While such a procedure is cumbersome and expensive during initial installation it is even more hazardous and troublesome during repair and maintenance.

When a rack is substantially filled with electronic equipment great care must be exercised in removing one unit to avoid damage to the remainder. Again, it is a job for at least two men, one of whom must carefully support the unit in position while the other removes the mounting bolts. When the bolts have been removed the unit is free and can be withdrawn from the rack. However, the slightest lateral movement of the unit during removal may result in permanent damage to the unit or to the adjacent equipment.

Thus, it is one important object of this invention to provide a unique mounting means for sliding units in a supporting frame.

It is another object of this invention to provide support means for electronic units adapted for universal positioning within conventional relay racks.

It is still another object of this invention to provide a slide assembly for use in relay racks and adapted to slidably receive electronic units having standard front panels and chassis of varying dimensions.

Another important object of this invention is the provision of supporting slides for mounting in relay racks wherein the slides retain units resting thereon against lateral or angular movement.

It is still a further object of this invention to provide a slide assembly which is extremely simple and inexpensive to manufacture, requires no additional mounting space and is infinitely adjustable over the entire height of the supporting frame.

Further and additional objects of this invention will become manifest from a consideration of this description, the accompanying drawings and the appended claims.

In one form of the instant invention chassis supporting slide constructions are provided for mounting in a conventional relay rack between adjustable vertical supports. More particularly the slide constructions are infinitely variable within the full height of the rack, are simple and positive in their gripping action on the supports and include adjustable guide means to restrain the supporting units against lateral and angular movement.

For a more complete understanding of this invention reference will now be made to the accompanying drawings wherein.

Figure 1:
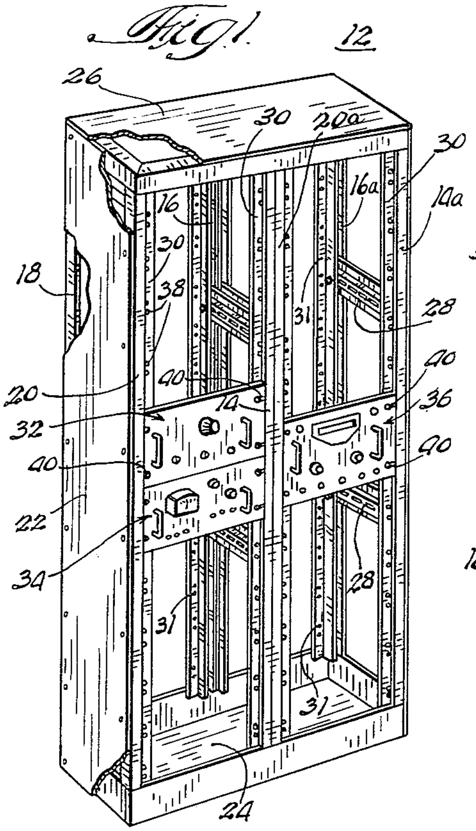
FIG. 1 is a perspective view of a relay rack incorporating the instant invention.

Referring now to the drawings and more particularly to FIG. 1, the illustrated relay rack 12 is of one conventional design having two complete vertical sections secured together. Each vertical section has a frame composed of four vertical angle iron supports 14, 16, 18 and 20 with a skin of sheet metal secured thereto with screws or the like. The vertical framing 14–20 is welded to a preformed base 24 and a similar preformed roof 26. The sides of the relay rack are reinforced with channel shaped and slotted cross braces 28. In the particular relay rack shown the framing, roof 26 and base 24 are welded together to form an integral structure while the side panels 22 are held in place with machine screws. In other commercially available devices the entire frame is formed integrally with welded panels and in still others the sheet metal is folded to form reinforced corners, omitting some of the auxiliary framing. All of these devices include some form of slotted cross braces 28 and all are adapted for use with the instant invention.

The rack assembly 12 shown in FIG. 1 includes two relay racks in side by side relationship enclosed within a single housing. Conventional racks are obtainable which receive a single column of equipment and other racks are completely open on the sides so that they may be stacked side by side to form an array of columns of units unlimited in number. It has been customary to secure vertical supports such as angle iron supports 30 in the racks adjacent to the front face thereof. The vertical supports 30 include a regular pattern of threaded apertures 38 and are generally secured to the cross braces 28 and abut the corner framing such as angle irons 14 and 20. In positioning heavy electronic units in such racks a technician positions a unit such as units 32, 34 and 36 against the vertical supports 30 and between the frames 20 and 14. The technician attempts to support the front panel of the unit against the vertical supports 30 so that slots 39 formed in the panel align with apertures 38 formed in the vertical supports. A second technician then must apply machine screws 40 through the slots 39 and into the threaded apertures 38 to support the units against the vertical supports. This means that the front panel would support the entire weight of the unit and the chassis would be suspended in a cantilever relationship.

The instant invention provides novel means for supporting the individual units 32, 34 and 36 in the rack 12. A slide assembly 42 is positioned between each forward vertical support 30 and an associated rear support 31 to receive one side edge of the chassis 44 of an electronic unit 32. All slide assemblies are identical although the slides for the right-hand edge of the rack are obviously reversed to accommodate the units. With the unit supported between two slides 42, the front panel 46 supports no weight and the chassis rests unstrained upon the slides. Machine screws 48 may be employed to hold the front panel against the front vertical supports 30 and in general planar alignment with the frame members 14 and 20.

Figure 2:
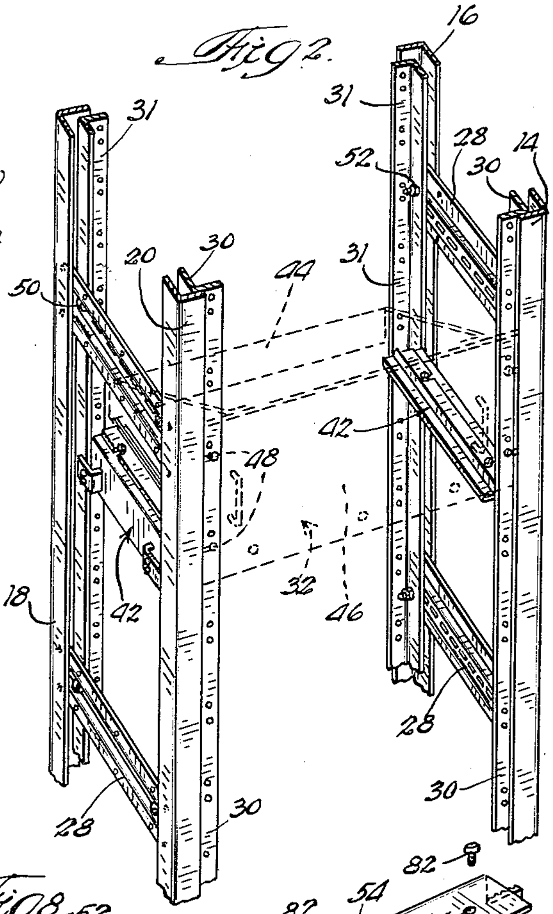
FIG. 2 is a perspective view of a portion of the relay rack of FIG. 1 showing an electronic unit in phantom lines positioned on a pair of slide constructions in accordance with this invention.

As shown more clearly in FIG. 2 the cross braces 28 are secured as by welding to the frame members 14–20 and the vertical supports 30, which in the instant embodiment are angle irons, are secured to the cross braces 28 by bolts 50 and associated nuts 52. The vertical supports may be varied in position somewhat depending upon the depth of the chassis which are being supported and the length of the slide assemblies.

Figure 9:
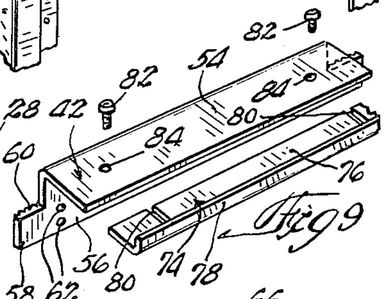
FIG. 9 is an exploded view of the slide construction.
Figure 10:
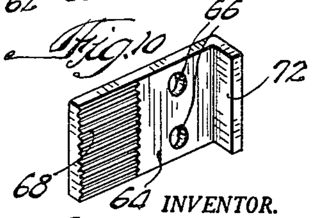
FIG. 10 is an enlarged view of the clamp portion of the slide construction.

The slide constructions 42 are infinitely adjustable to any position along the height of vertical supports 30 and are adapted for quick and easy adjustment with positive placement. The manner in which this is accomplished is clearly shown in the remaining figures and particularly FIGS. 3 and 4. The slide construction 42 comprises a generally horizontal shelf 54 and a supporting skirt 56. The supporting skirt has end portions or tabs 58 which are best seen in FIG. 9. These end tabs are milled or knurled on face 60 to present a roughened surface which will positively engage the vertical supports 30. The end tabs 58 are of reduced height and spaced from the shelf 54 for greater versatility as will be explained.

Figures 7, 8:
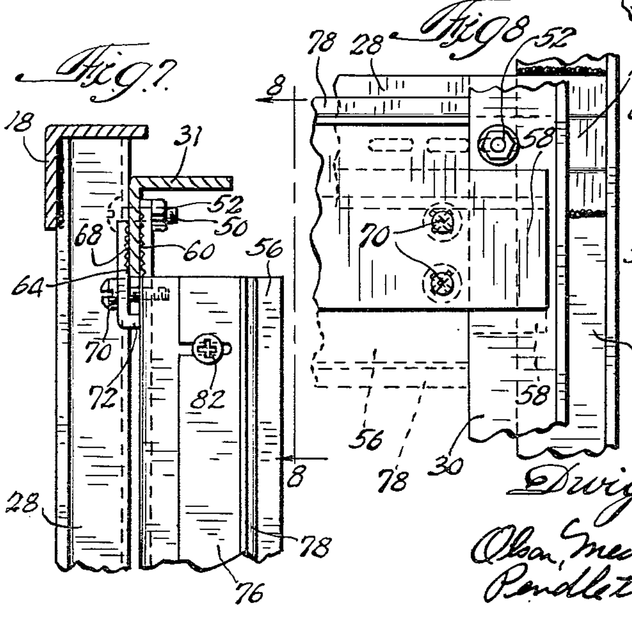
FIG. 7 is a fragmentary sectional view of one corner of the rack shown in FIG. 6.
FIG. 8 is a side view of the fragment shown in FIG. 7.

Inwardly in the skirt web 56 and adjacent to the end tab 58 are a pair of threaded apertures 62. A clamp 64 is designed for cooperation with the web 56 and tab 58 and has two enlarged apertures 66 disposed and spaced so that they overlie the threaded apertures 62. Machine screws 70 are passed through aperture 66 to engage threaded apertures 62 and draw a roughened or knurled end portion 68 of clamp 64 toward the corresponding roughened surface 60 of tab 58. Thus, by operation of the machine screws 70, best shown in FIG. 7, the vertical support 30 is rigidly clamped between the knurled surface 60 of tab 58 and the corresponding knurled surface 68 of clamp 64.

In the preferred embodiment a lip 72 is provided on clamp 64 having a transverse dimension substantially equal to the thickness of material of support 30 whereby the knurled surfaces 60 and 68 are disposed in substantially parallel clamping relationship when properly engaged with the vertical support 30. Thus by positioning slide construction 42 at the desired level at each side of a rack 12 between supports 30 and 31 and tightening screws 70 the slide is positioned in the precise location required for supporting a given electronic unit.

Figure 3:
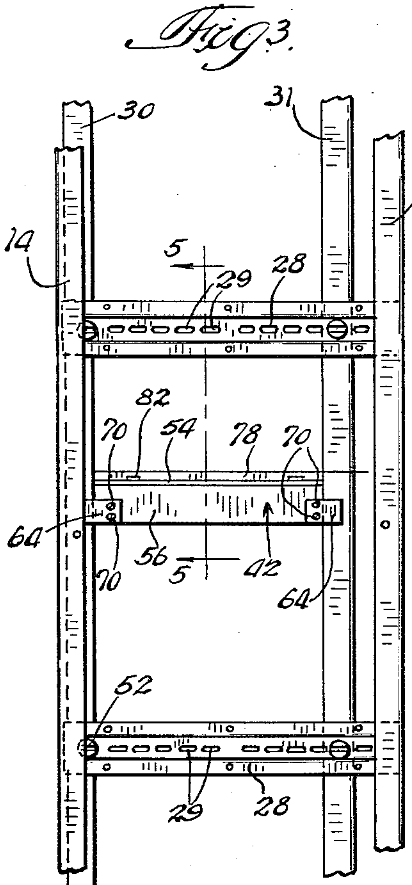
FIG. 3 is a side view of the portion of the rack shown in FIG. 2.

As shown clearly in FIG. 3 it would be possible that the cross brace 28 would interfere with the precise location of slide construction 42. However, by providing a tab portion 58 and cooperating clamp 64 of reduced height it is possible to so position slide construction 42 that the horizontal shelf 54 is directly in alignment with the lower portion of cross brace 28. Slide 42 may be raised so that it passes inwardly of brace 28 to a point where shelf 54 generally aligns with the central axis of cross brace 28. In the event that a shelf location is desired above the central axis but still aligned with cross brace 28 then in accordance with the teaching of this invention it is only necessary to remove and invert the slide construction 42 so that the shelf 54 extends outwardly from the lower edge of the skirt 56, as shown in broken lines in FIG. 8. In that event the slide 42 may be lowered to a point where the shelf 54 is in alignment with a portion of cross brace 28 down to about its central axis and no interference will be encountered.

Figure 4:
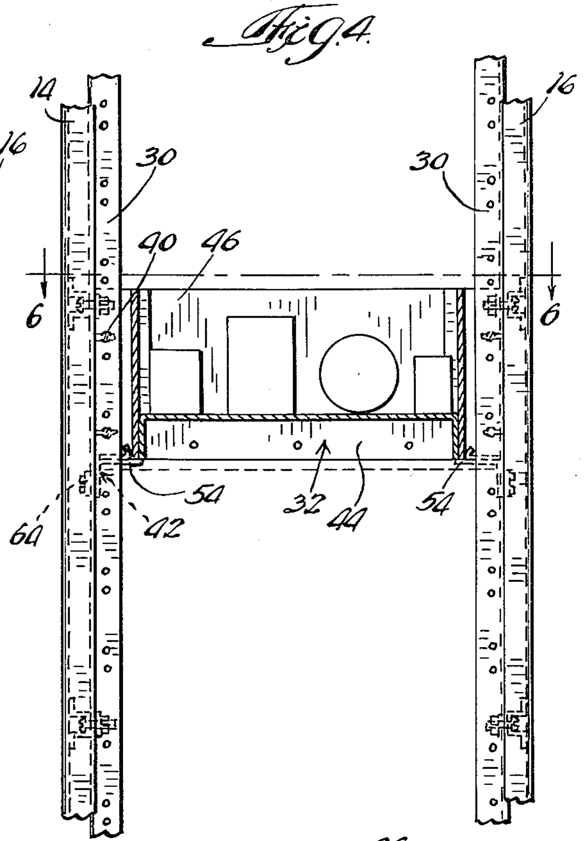
FIG. 4 is a front view of the rack portion shown in FIG. 2 with the electronic unit shown partially in section.
Figure 5:
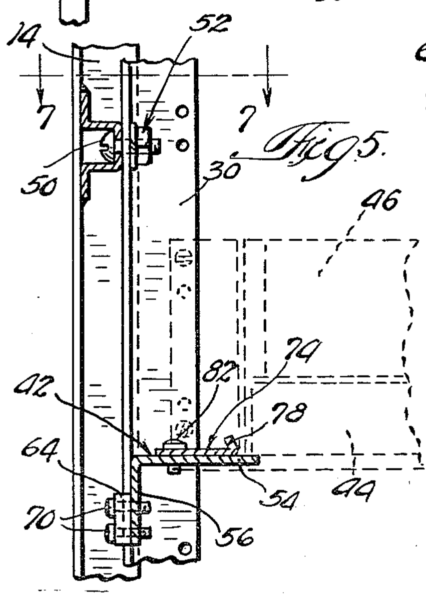
FIG. 5 is a fragmentary view of the rack taken on the line 5—5 of FIG. 3.
Figure 6:
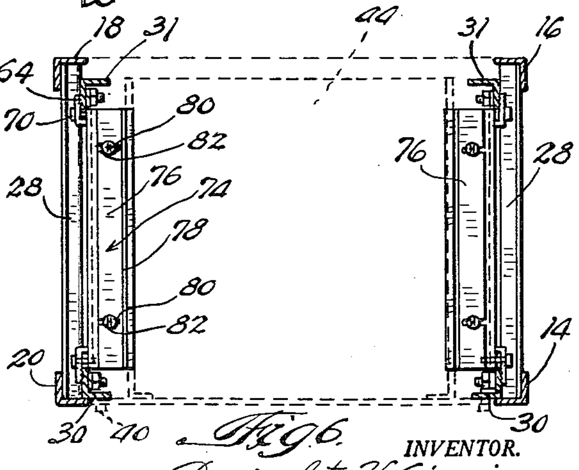
FIG. 6 is a top sectional view of the rack taken on the line 6—6 of FIG. 4.

As already explained, electronic units conventionally have front panels of standard 19″ width and relay racks are typically in the order of 22″ wide width 19″ front openings so that the panel fits closely therein. The vertical supports 30, as shown in FIG. 4, align with the side edges of panel 46 to limit inward movement of the electronic unit on the shelves 54. Also the supports 30 have threaded apertures whereby appropriate machine screws 40 may be employed to prevent accidental removal of the unit.

While the front panels of most electronic units have the standard 19″ width, the chassis associated therewith vary widely. Thus, it would be possible in using the instant invention that in removing or inserting a unit the unit would be shifted laterally or angularly to such an extent that the unit would fall from one of the shelves 54 and damage the unit and associated equipment thereunder. To avoid this possibility a universally adjustable guide is provided on each shelf. As shown in FIG. 9 the guide 74 has a base 76 which rests upon the shelf 54 and an angular upstanding lip 78. Base 76 has two slots 80 which receive machine screws 82 threaded into appropriate apertures 84 in shelf 54. Thus with the unit 32 in place as shown in FIGS. 2 and 4 the guides 74 may be manually adjusted to engage the sides of chassis 44 and screws 82 tightened to maintain the guides in position. Thereafter the electronic unit 32 may be removed and replaced by sliding the unit on shelves 54 without hazard of lateral or angular movement which might result in accidental displacement of the unit 32.

It is preferred that both surfaces of shelves 54 have a heavy chromium layer applied thereto by plating to avoid damage or galling of the surfaces from the sliding metal chassis. Both surfaces should be so plated in view of the reversible nature of the slide construction already described. As should be apparent, if the slide construction 42 is inverted to overcome an interference with cross brace 28 then machine screws 82 are removed from the outer shelf surface and the guides 74 moved to the inner surface where the screws 82 may be replaced to support the guides in the conventional manner already described.

The length of shelf 54 is limited to substantially less than the entire depth of the relay rack in order to provide space at the corners for electric cabling and the like. However, as will be obvious, the slide construction may be made of any desired length without departing from the spirit and scope of this invention. By providing two bolts to engage the clamp 64 and urge it toward the end tab 60 inadvertent rotation and consequent slipping of the slide construction is avoided. The slide construction of this invention has been found extremely versatile and positive in its operation without hazard of slipping, accidental displacement of the supporting chassis or any other malfunction. The knurled, roughened surfaces on the tab and clamp may in some instances be omitted depending upon the surfaces of the vertical supports. The horizontal milling in the instance of extremely hard, smooth supports is important in insuring against slippage.

For safety, cleanliness and aesthetics it is important that the units in a given column fit together closely without openings therebetween. Thus the ability to vary the positioning of each shelf without limitation and to positively maintain the units at predetermined heights are extremely advantageous. While it might be possible to drill the vertical supports 30 and 31 along their length, or employ slots, nevertheless the infinite variation and ease of positioning provided by the instant invention would be lacking. The cost of special drilling and fabrication for a drilled or slotted system would be substantial compared to the instant invention.

Equipment units mounted in the rack assemblies of the instant invention can be partially or completely removed with ease. Thus it is frequently possible to slide a unit forward somewhat for trouble shooting or maintenance without interrupting the inter-unit cabling or completely dismantling the equipment. Mounting, equipment removal, replacement and maintenance can be accomplished by one technician.

In addition to the rack, illustrated hinged doors can be provided on the front, back or sides. The front supports 30 can be moved rearwardly on cross braces 28 by shifting bolts 50 along slots 29 whereby the units 32, 34 and 36 are recessed to accommodate a hinged front door, if desired Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A slide construction for universal positioning between two generally vertical supports secured together with a plurality of cross members comprising a generally planar elongate shelf having an elongate edge, a web extending transversely from said elongate edge of said shelf, an end tab extending from said web beyond each end thereof and each having portions adapted to engage one of said vertical supports, clamp means secured to said web and generally coextensive with each end tab, said end tab and said clamp means having transverse dimensions substantially less than the width of said web and extending from said web at positions spaced from said elongate shelf, said shelf extending transversely from said web in a plane displaced vertically from said clamp means whereby said cross members and said shelf may be generally coplanar, and securing means interconnecting each of said clamp means and said web and adapted to draw said clamp means toward said end tabs whereby one of said vertical supports is rigidly maintained therebetween.

2. A slide construction for universal positioning between two generally vertical supports secured together with a plurality of cross members comprising a generally planar elongate shelf having an elongate edge, elongate guide means secured to said shelf and including a base portion adjustably secured to said shelf and a lip portion extending upwardly from said shelf generally parallel to said edge, a web extending transversely from said elongate edge of said shelf, an end tab extending from said web beyond each end thereof and having roughened portions adapted to engage one of said vertical supports, clamp means secured to said web and generally coextensive with each end tab, said end tab and said clamp means having transverse dimensions substantially less than the width of said web and extending from said web at positions spaced from said elongate shelf, said shelf extending transversely from said web in a plane displaced vertically from said clamp means whereby said cross members and said shelf may be generally coplanar, and securing means interconnecting each of said clamp means and said web and adapted to draw said clamp means toward said end tabs whereby one of said vertical supports is rigidly maintained therebetween.

3. A slide construction for universal positioning between two generally vertical supports secured together with a plurality of cross members comprising a generally planar elongate shelf having an elongate edge, elongate guide means secured to said shelf and including a base portion adjustably secured to said shelf and a lip portion extending upwardly from said shelf generally parallel to said edge, a web extending transversely from said elongate edge of said shelf, an end tab extending from said web beyond each end thereof and having roughened portions adapted to engage one of said vertical supports, clamp means secured to said web and generally coextensive with each end tab, said clamp means having a roughened portion coextensive with said tab, a body portion and a transverse lip engaging said web, said end tab and said clamp means having transverse dimensions substantially less than the width of said web and extending from said web at positions spaced from said elongate shelf, said shelf extending transversely from said web in a plane displaced vertically from said clamp means whereby said cross members and said shelf may be generally coplanar, and securing means interconnecting each of said clamp means and said web and adapted to draw said clamp means toward said end tabs whereby one of said vertical supports is rigidly maintained therebetween.

4. A slide construction for universal positioning between two generally vertical supports secured together with a plurality of cross members comprising a generally planar elongate shelf having an elongate edge, elongate guide means secured to said shelf and including a base portion adjustably secured to said shelf and a lip portion extending upwardly from said shelf generally parallel to said edge, a web extending transversely from said elongate edge of said shelf, an end tab extending from said web beyond each end thereof and having roughened portions adapted to engage one of said vertical supports, clamp means secured to said web and generally coextensive with each end tab, said clamp means having a roughened portion coextensive with said tab, an apertured body portion and a transverse lip engaging said web, said end tab and said clamp means having transverse dimensions substantially less than the width of said web and extending from said web at positions spaced from said elongate shelf, said shelf extending transversely from said web in a plane displaced vertically from said clamp means whereby said cross members and said shelf may be generally coplanar, and securing means interconnecting each of said clamp means and said web and adapted to draw said clamp means toward said end tabs whereby one of said vertical supports is rigidly maintained therebetween, said securing means comprising two threaded members engaging said web and passing through apertures in said body portion.

5. A slide construction for universal positioning between two generally vertical supports secured together with a plurality of cross members comprising a generally planar elongate shelf having an elongate edge, elongate guide means secured to the upper surface of said shelf and including a base having transverse slots therein and a lip portion extending upwardly from said base, threaded means engaging said shelf through said slots and securing said guide means to said shelf whereby said lip is adjustably positioned generally parallel to said edge, a web extending transversely from said elongate edge of said shelf, an end tab extending from said web beyond each end thereof and having roughened portions adapted to engage one of said vertical supports, clamp means secured to said web and generally coextensive with each end tab, said end tab and said clamp means having transverse dimensions substantially less than the width of said web and extending from said web at positions spaced from said elongate shelf, said shelf extending transversely from said web in a plane displaced vertically from said clamp means whereby said cross members and said shelf may be generally coplanar, and securing means interconnecting each of said clamp means and said web and adapted to draw said clamp means toward said end tabs whereby one of said vertical supports is rigidly maintained therebetween.

6. A shelf assembly for slidably receiving units comprising four generally rectangularly arranged vertical supports arranged with cross braces as two pairs to receive such units therebetween, a slide construction disposed between the supports of each of said pairs, said slide constructions being substantially coplanar and each comprising a generally planar elongate shelf having an elongate edge, a web extending transversely from said elongate edge of said shelf, an end tab extending from said web beyond each end thereof and having roughened portions adapted to engage one of said vertical supports, clamp means secured to said web and generally coextensive with each end tab, and securing means interconnecting each of said clamp means and said web and adapted to draw said clamp means toward said end tabs whereby one of said vertical supports is rigidly maintained therebetween, and elongate guide means secured to the upper surface of said shelf and including a base engaging said shelf and a lip portion extending upwardly from said base, said guide means being adjustable transversely on said shelf whereby such a unit rests on said shelves between said guide means.

7. A shelf assembly for slidably receiving units comprising four generally rectangularly arranged vertical supports arranged with cross braces as two pairs to receive such units therebetween, and a slide construction disposed between the supports of each of said pairs, said slide constructions being substantially coplanar and each comprising a generally planar elongate shelf having an elongate edge, elongate guide means secured to said shelf and including a base having transverse slots therein and a lip portion extending upwardly from said base, threaded means engaging said shelf through said slots and securing said guide means to said shelf whereby said lip is adjustably positioned generally parallel to said edge and such a unit rests on said shelves between said guide means, a web extending transversely from said elongate edge of said shelf, an end tab extending from said web beyond each end thereof and having roughened portions adapted to engage one of said vertical supports, clamp means secured to said web and generally coextensive with each end tab, said end tab and said clamp means having transverse dimensions substantially less than the width of said web and extending from said web at positions spaced from said elongate shelf, said shelves extending transversely from said web in a plane displaced vertically from said clamp means whereby said cross braces and said shelves may be generally coplanar, and securing means interconnecting each of said clamp means and said web and adapted to draw said clamp means toward said end tabs whereby one of said vertical supports is rigidly maintained therebetween.

8. A rack assembly for removable units comprising a housing defining a vertical storage space having a generally rectangular cross section and an open front face, transverse cross members extending rearwardly from said front face to define a unit receiving space therebetween, generally vertical supports secured to said cross members in spaced relationship on each side of said front face, and a slide construction on each side of said front face disposed between two supports, said slide construction being arranged in substantially coplanar relationship and each slide construction comprising a generally planar elongate shelf having an elongate edge, elongate guide means secured to the upper surface of said shelf and including a base having transverse slots therein and a lip portion extending upwardly from said base, means engaging said shelf through said slots and securing said guide means to said shelf whereby said lip is adjustably positioned generally parallel to said edge, a web extending transversely from said elongate edge of said shelf, an end tab extending from said web beyond each end thereof and having roughened portions adapted to engage one of said vertical supports, clamp means secured to said web and generally coextensive with each end tab, said end tab and said clamp means having transverse dimensions substantially less than the width of said web and extending from said web at positions spaced from said elongate shelf, said shelf extending transversely from said web in a plane displaced vertically from said clamp means whereby said cross members and said shelf may be generally coplanar, and securing means interconnecting each of said clamp means and said web and adapted to draw said clamp means toward said end tabs whereby one of said vertical supports is rigidly maintained therebetween.

9. The rack assembly of claim 8 wherein said vertical supports have a plurality of threaded apertures therein and threaded means are provided for engaging said units and said threaded apertures for securing said units in fixed position on said elongate shelf within said housing.

10. The rack assembly of claim 8 wherein said housing has sheet material substantially enclosing the sides and rear surface thereof to enclose said units.

References Cited in the file of this patent

UNITED STATES PATENTS

| | | |
|---|---|---|
| 405,098 | Kendall | June 11, 1889 |
| 826,321 | Eustis | July 17, 1906 |
| 1,113,183 | Baehn | Oct. 13, 1914 |
| 2,756,369 | Gorrie | July 24, 1956 |